United States Patent
Fujii (10) Patent No.: US 10,908,856 B2
(45) Date of Patent: Feb. 2, 2021

(54) IMAGE FORMING APPARATUS FOR EXECUTING AUTOMATIC INSTALLATION OF DRIVER TO EXTERNAL TERMINAL BY REMOTE CONTROL AND IMAGE FORMING SYSTEM INCLUDING THE IMAGE FORMING APPARATUS

(71) Applicant: KYOCERA Document Solutions Inc., Osaka (JP)

(72) Inventor: Atsushi Fujii, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/567,650

(22) Filed: Sep. 11, 2019

(65) Prior Publication Data

US 2020/0089447 A1 Mar. 19, 2020

(30) Foreign Application Priority Data

Sep. 13, 2018 (JP) .................................. 2018-171585

(51) Int. Cl.
*G06F 3/12* (2006.01)

(52) U.S. Cl.
CPC .......... *G06F 3/1238* (2013.01); *G06F 3/1225* (2013.01); *G06F 3/1287* (2013.01); *G06F 3/1292* (2013.01)

(58) Field of Classification Search
None
See application file for complete search history.

(56) References Cited

U.S. PATENT DOCUMENTS 7,684,064 B2 * 3/2010 Kimura ................. G06F 3/1222
358/1.14
7,743,374 B2 * 6/2010 Machida ............... G06F 9/4411
717/171

(Continued)

FOREIGN PATENT DOCUMENTS

JP 2007-249650 A 9/2007

OTHER PUBLICATIONS

The extended European search report issued by the European Patent Office dated Feb. 24, 2020, which corresponds to EP19196426.1-1209 and is related to U.S. Appl. No. 16/567,650.

*Primary Examiner* — Paul F Payer
(74) *Attorney, Agent, or Firm* — Studebaker & Brackett PC (57) ABSTRACT

An image forming apparatus including an image forming part forming an image includes a user authenticating part, a terminal selecting part and an installation instructing part. The user authenticating part authenticates a user on the basis of authentication information peculiar to the user in installing operation making an external terminal communicably connected to the image forming apparatus install a driver of the image forming apparatus. The terminal selecting part selects the external terminal registered in association with the user authenticated by the user authenticating part as an object terminal in the installing operation. The installation instructing part establishes remote access to the object terminal on the basis of log-in information previously registered with regard to the object terminal selected by the terminal selecting part and transmits installation instruction making the object terminal execute automatic installation of the driver to the object terminal.

12 Claims, 6 Drawing Sheets

(56) References Cited

U.S. PATENT DOCUMENTS

| | | | |
|---|---|---|---|
| 2002/0083431 A1 | 6/2002 | Machida | |
| 2008/0244566 A1* | 10/2008 | Fukaya | G06F 9/4411 717/176 |
| 2009/0150880 A1* | 6/2009 | Park | G06F 8/61 717/174 |
| 2018/0150268 A1* | 5/2018 | Choi | G06F 3/1285 |

* cited by examiner

IMAGE FORMING APPARATUS FOR EXECUTING AUTOMATIC INSTALLATION OF DRIVER TO EXTERNAL TERMINAL BY REMOTE CONTROL AND IMAGE FORMING SYSTEM INCLUDING THE IMAGE FORMING APPARATUS

INCORPORATION BY REFERENCE

This application is based on and claims the benefit of priority from Japanese Patent application No. 2018-171585 filed on Sep. 13, 2018, the entire contents of which are incorporated herein by reference.

BACKGROUND

The present disclosure relates to an image forming apparatus making an external terminal install a driver, and an image forming system including this image forming apparatus.

An image forming apparatus, such as a multifunction peripheral, is communicably connected to an external terminal via a predetermined network. In order that the external terminal controls the image forming apparatus to carry out print or the like, it is necessary to install the driver corresponding to this image forming apparatus.

For example, in a well-known method of distributing installation information, a network device includes a means authenticating a user using a client device, identifies the user when user authentication is performed by this means, and transmits the installation information to an e-mail address of the authenticated user. The user manually carries out installation for using the network device in accordance with the installation information.

In a case where a new image forming apparatus is established, a user needs to install a driver to various external terminals using the image forming apparatus, to confirm a host name and an IP address of the image forming apparatus, and then, to set the host name and the IP address to each external terminal. However, if the external terminals are placed at various positions separated from the image forming apparatus, because the user must come and go between the image forming apparatus and each external terminal in order to carry out installation work of the driver and confirmation work of the host name and the IP address of the image forming apparatus, much labor is required and a burden on the user is increased.

SUMMARY

In accordance with the present disclosure, an image forming apparatus including an image forming part forming an image includes a user authenticating part, a terminal selecting part and an installation instructing part. The user authenticating part authenticates a user on the basis of authentication information peculiar to the user in installing operation making an external terminal communicably connected to the image forming apparatus install a driver of the image forming apparatus. The terminal selecting part selects the external terminal registered in association with the user authenticated by the user authenticating part as an object terminal in the installing operation. The installation instructing part establishes remote access to the object terminal on the basis of log-in information previously registered with regard to the object terminal selected by the terminal selecting part and transmits installation instruction making the object terminal execute automatic installation of the driver to the object terminal.

In accordance with the present disclosure, an image forming apparatus including an image forming part forming an image includes a user authenticating part, a terminal selecting part and an installation instructing part. The user authenticating part authenticates a user on the basis of authentication information peculiar to the user in installing operation making an external terminal communicably connected to the image forming apparatus install a driver of the image forming apparatus. The terminal selecting part selects the external terminal registered in association with the user authenticated by the user authenticating part as an object terminal in the installing operation. The installation instructing part sends an e-mail instructing installation of the driver on the basis of an e-mail address previously registered with regard to the object terminal selected by the terminal selecting part as installation instruction to the object terminal.

In accordance with the present disclosure, an image forming system includes the image forming apparatus as described above.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
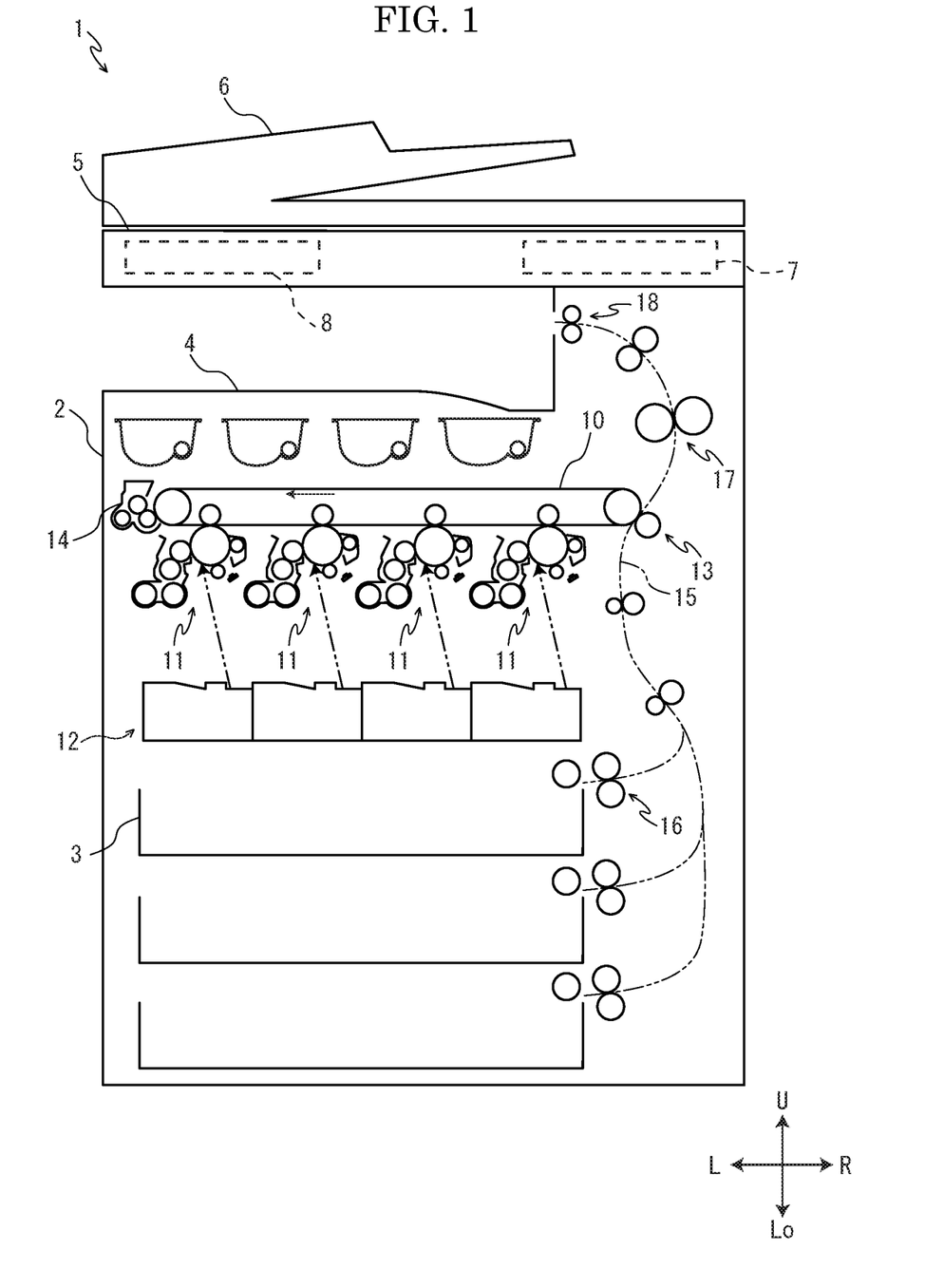
FIG. 1 is a sectional view schematically showing a multifunction peripheral according to a first embodiment of the present disclosure.

First, entire structure of a multifunction peripheral 1 (an image forming apparatus) according to a first embodiment of the present disclosure will be described with reference to FIG. 1. Hereinafter, for convenience of description, it will be described so that the front side of the multifunction peripheral 1 is positioned at the near side on a paper sheet of FIG. 1. Arrows L, R, U and Lo in FIG. 1 respectively indicate a left side, a right side, an upper side and a lower side of the multifunction peripheral 1.

The multifunction peripheral 1 includes a roughly box-formed apparatus body 2. In a lower part of the apparatus body 2, a plurality of sheet feeding cartridges 3 storing sheets are provided. In an in-body space of an upper part of the apparatus body 2, an ejected sheet tray 4 is provided.

In the upper part of the apparatus body 2, an image reading part 5 reading a document as image data is provided. In a top face of the image reading part 5, a document table composed of a platen glass is provided. The image reading part 5 reads an image of the document placed on the document table by a scanner to create image data. Above the image reading part 5, a document conveying part 6 feeding the document to the image reading part 5 is provided. The document conveying part 6 is openably/closably attached as a cover member covering the platen glass of the image reading part 5.

Further, in the upper part of the apparatus body 2, an operation display part 7 is attached at a front side. The operation display part 7 includes, for example, operation keys, such as a ten key, a start key, a system menu key, a transmission key, a copy key and a confirmation ley, and a display device, such as a touch panel, to receive operation input from a user. The operation display part 7 includes a driver installation key provided as the operation key or operably displayed on the touch panel. Moreover, in the upper part of the apparatus body 2, a card reader 8 is provided at the front side. When an IC card, such as an employee identification card, of the user using the multi-function peripheral 1 is held up to the card reader 8, the card reader 8 reads card information peculiar to the user, such as an employee ID, stored in the IC card with a non-contact manner.

In a central part of the apparatus body 2, an intermediate transferring belt 10 is windingly stretched among a plurality of conveying rollers. At a lower side of the intermediate transferring belt 10, four image forming parts 11 forming the image are provided for respective toner colors (for example, four colors of yellow, magenta, cyan and black). At a lower side of the four image forming parts 11, an exposure part 12 is provided. At a right side of the intermediate transferring belt 10, a secondary transferring part 13 is provided and, at a left side of the intermediate transferring belt 10, a cleaning unit 14 cleaning the intermediate transferring belt 10 is provided. The secondary transferring part 13 is composed of a part at a right end side of the intermediate transferring belt 10 and a secondary transferring roller.

Each image forming part 11 includes a rotatably photo-sensitive drum as an image carrier. At the periphery of the photosensitive drum, a charging part, a developing part, a primary transferring part, a static eliminating part and a cleaning device are disposed in a sequential order of electrophotographic process. At an upper side of developing parts of the image forming parts 11, toner containers corresponding to respective image forming parts are provided for the respective toner colors (for example, four colors of yellow, magenta, cyan and black). Each toner container contains the toner of each color.

At a right side part in the apparatus body 2, a conveying path 15 of the sheet is provided. At an upstream end of the conveying path 15, a plurality of sheet feeding part 16 is provided for the respective sheet feeding cartridges 3. At a middle stream part of the conveying path 15, the above-described secondary transferring part 13 is provided. At a downstream part of the conveying path 15, a fixing device 17 is provided and, at a downstream end of the conveying path 15, a sheet ejecting part 18 is provided.

Next, an image forming operation of the multifunction peripheral 1 will be described. In the multifunction peripheral 1, image data is inputted and a printing start is instructed from the image reading part 5, an external terminal 23 (refer to FIG. 2) connected to a communicating part 22 (refer to FIG. 2) or the like. In each image forming part 11, the photosensitive drum is electrically charged by the charging part, and then, exposed on the basis of the image data by the exposure part 12, and thereby, an electrostatic latent image is formed on the photosensitive drum. The electrostatic latent image on the photosensitive drum is developed for a toner image of each color by the developing part. The toner image on the photosensitive drum is primarily transferred to a surface of the intermediate transferring belt 10 by the primary transferring part. The four image forming parts 7 sequentially carry out the above-described operation, and thereby, a toner image of full color (a color toner image) is formed on the intermediate transferring belt 10. The color toner image is supplied to a secondary transferring part 13 at a predetermined secondary transfer timing by rotation of the intermediate transferring belt 10.

On the other hand, a sheet stored in the sheet feeding cartridge 3 is picked up by the sheet feeding part 16, and then, conveyed on the conveying path 15. Subsequently, the sheet on the conveying path 15 is conveyed to the secondary transferring part 13 at the predetermined secondary transfer timing described above. In the secondary transferring part 13, the color toner image on the intermediate transferring belt 10 is secondarily transferred to the sheet. The sheet having the secondarily transferred color toner image is conveyed to a downstream side on the conveying path 15 and, after the color toner image is fixed to the sheet by the fixing part 17, the sheet is ejected from the sheet ejecting part 18 to the ejected sheet tray 4.

Figure 2:
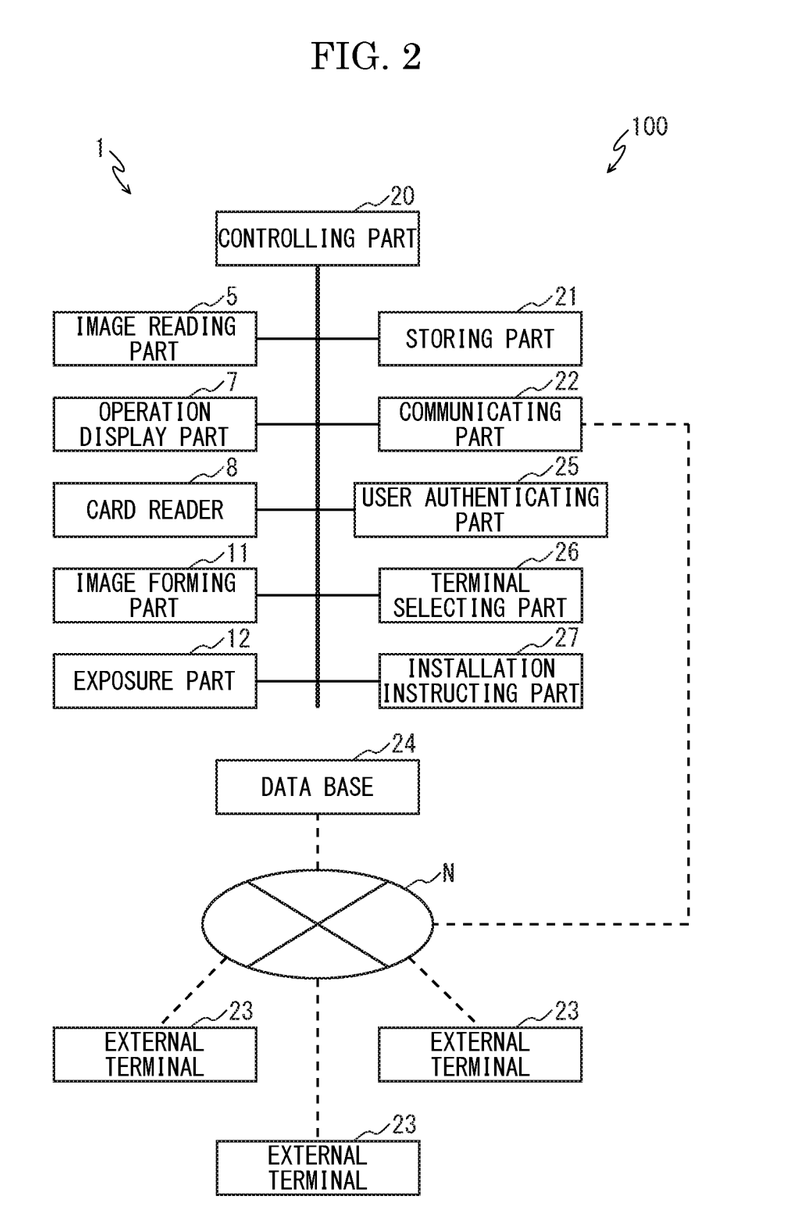
FIG. 2 is a block diagram showing electric structure of an image forming system including the multifunction peripheral according to the first embodiment of the present disclosure.

Next, electric structure of the above-described multifunction peripheral 1 will be described with reference to FIG. 2. The multifunction peripheral 1 includes a controlling part 20, such as CPU, and a storing part 21, such as ROM and RAM, inside the apparatus body 2. The controlling part 20 controls each component connected to the controlling part 20 on the basis of control programs and control data stored in the storing part 21. The storing part 21 stores a host name and an IP address of the multifunction peripheral 1, and a driver name and a storage place (e.g. a URL of a download source or a folder name of a storage source in the multifunction peripheral 1) of a driver of the multifunction peripheral 1.

The controlling part 20 is connected to the image reading part 5, the operation display part 7, the card reader 8, the image forming parts 11, the exposure part 12 and other components of the multifunction peripheral 1. Further, the controlling part 20 is connected to the communicating part 22, and the communicating part 22 is connected to a plurality of external terminals 23 and a data base 24 via a determined network N, such as a LAN or an internet. Thereby, the multifunction peripheral 1 together with the plurality of external terminals 23, a data base 24 and the network N compose an image forming system 100.

The multifunction peripheral 1 includes a user authenticating part 25, a terminal selecting part 26 and an installation instructing part 27 controlled by the controlling part 20 in order to execute installing operation making the external terminal 23 communicably connected to the multifunction peripheral 1 install the driver of the multifunction peripheral 1. Incidentally, the user authenticating part 25, the terminal selecting part 26 and the installation instructing part 27 may be constructed by programs stored in the storing part 21 and executed by the controlling part 20. Details of the user authenticating part 25, the terminal selecting part 26 and the installation instructing part 27 will be described later.

Each external terminal 23 is a computer, such as a personal computer or a tablet terminal, communicated to the multifunction peripheral 1, and becomes a usable state when log-in of the external terminal 23 is carried out by inputting a predetermined log-in password. Each external terminal 23 is constructed so as to permit the communicably connected multifunction peripheral 1 remote access subject to input of the log-in password during log-in, for example, permits remote installation of software, such as the driver.

The data base 24 registers the user using the multifunction peripheral 1 and each external terminal 23 in previously association with each other, and may register a plurality of users and the plurality of external terminals 23. For example, the data base 24 registers authentication information corresponding to card information of an ID card of each user, terminal information, such as a computer name, of each external terminal 23 used by each user, and log-in information, such as the log-in password, in association with each other. The data base 24 may register one external terminal 23 or the plurality of external terminals 23 in association with one user (one card information). Incidentally, although, in the first embodiment, an example of the data abase 24 as an external device of the multifunction peripheral 1 communicably connected to the multifunction peripheral 1 is described, the data abase 24 may be provided in the multifunction peripheral 1 or data stored in the data abase 24 may be stored in the storing part 21 of the multifunction peripheral 1.

Moreover, the data base 24 may register a group ID identifying a group, such as a department, to which each user belongs in association with the user, and may apply a representative flag to the user as a representative of the group, such as a department head. In other words, in the data base 24, with regard to the user to which the representative flag of a predetermined group is applied, not only the user's own external terminal 23, but also the external terminals 23 of other users belonging to the group are associated.

Figure 3:
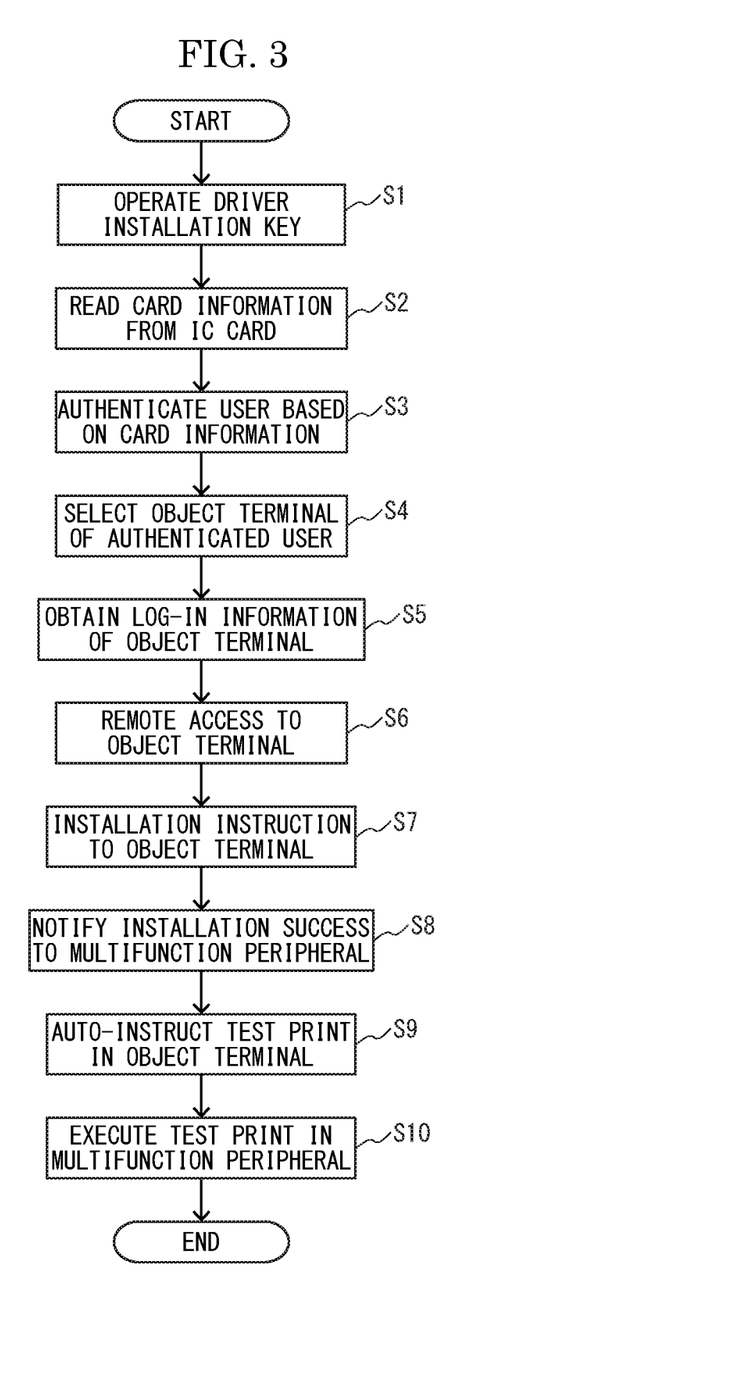
FIG. 3 is a flow chart showing an operation installing a driver of the multifunction peripheral to an external terminal in the multifunction peripheral according the first embodiment of the present disclosure.

Next, the installing operation in which the multifunction peripheral 1 makes the external terminal 23 install the driver will be described together with details of the user authenticating part 25, the terminal selecting part 26 and the installation instructing part 27 with reference to a flow chart of FIG. 3.

First, when the user operates the driver installation key of the operation display part 7 (step S1), the installing operation is started. When the installing operation is started, the controlling part 20 displays an instructing screen instructing reading of the IC card to the user by a pop-up screen or the like in the operation display part 7.

Then, when the user holds up the IC card to the card reader 8, the card reader 8 reads the card information from the IC card and transmits the card information to the controlling part 20 (step S2).

When the controlling part 20 receives the card information from the card reader 8, the controlling part 20 controls the user authenticating part 25 to make the user authenticating part 25 execute user authentication based on the card information. The user authenticating part 25 collates the card information read from the IC card in the card reader 8 with the authentication information stored in the data base 24 to authenticate the user (step S3).

When the user is authenticated by the user authenticating part 25, the controlling part 20 controls the terminal selecting part 26 to make the terminal selecting part 26 execute selection of the external terminal 23 (an object terminal) as an object of the installing operation. The terminal selecting part 26 selects the external terminal 23 registered in the data base 24 in association with the user authenticated in the user authenticating part 25 (an authenticated user) as the object terminal (step S4).

Incidentally, the terminal selecting part 26 may automatically select the external terminal 23 associated with the authenticated user as the object terminal, or may display the external terminals 23 registered in the data base 24 in the operation display part 7 with a list to make the user select the object terminal in accordance with operation of the user. Moreover, the terminal selecting part 26 may select, as the object terminal, the plural external terminals 23 associated with the authenticated user or the plural external terminals 23 registered by the group ID associated with the authenticated user.

When the object terminal is selected in the terminal selecting part 26, the controlling part 20 controls the installation instructing part 27 to make the installation instructing part 27 execute installation instruction of the driver to the object terminal. First, the installation instructing part 27 obtains the terminal information and the log-in information with regard to the object terminal stored in the data base 24 (step S5).

Incidentally, the controlling part 20 can recognize the external terminal 23 connected via the network N and during log-in. Thereupon, the installation instructing part 27 recognizes the object terminal among the external terminals 23 recognized in the controlling part 20 on the basis of the obtained terminal information.

The installation instructing part 27 communicates with the recognized object terminal via the network N and establishes remote access to the object terminal by using the log-in information (step S6). For example, the installation instructing part 27 displays a password inputting screen showing the terminal information, such as the computer name, in the operation display part 7 to direct the user to input the log-in information, such as the log-in password. When the user inputs the log-in information, the installation instructing part 27 establishes remote access to the object terminal by using the inputted log-in information.

Subsequently, the installation instructing part 27 transmits installation instruction performing automatic installation of the driver of the multifunction peripheral with so-called silent installation to the object terminal in which the remote access is established (step S7). For example, the installation instruction of the automatic installation is composed of a batch file, an object code, script data or other program indicating the host name and the IP address of the multifunction peripheral 1 and the driver name and the storage place of the driver and is constructed so as to be automatically executed in the object terminal. Incidentally, the installation instructing part 27 may transmit the installation instruction accompanied with the driver itself instead of indication of the storage place of the driver.

When the object terminal receives the installation instruction, the object terminal execute the automatic installation of the driver of the multifunction peripheral 1 on the basis of the host name and the IP address of the multifunction peripheral 1 and the driver name and the storage place of the driver indicated by the installation instruction. As a response to the installation instruction, if installation of the driver is succeeded, the object terminal transmits success notification to the multifunction peripheral 1 (step S8). If installation of the driver is failed, the object terminal transmits failure notification to the multifunction peripheral 1. The success notification and the failure notification may be built as response program into the installation instruction, or may be provided as function of the object terminal.

When the multifunction peripheral 1 receives the success notification of installation from the object terminal, the multifunction peripheral 1 may display a screen showing installation success by a pop-up screen in the operation display part 7 to notify installation success to the user. Moreover, the multifunction peripheral 1 may store success and failure of installation notified from the object terminal in the data base 24 in association with each object terminal, and may store a kind and a version about the driver installed to each object terminal on the basis of these notification.

Further, when the multifunction peripheral 1 receives the success notification of installation, the installation instructing part 27 transmits automatic transmission instruction of test print instruction to the object terminal in order to make the object terminal automatically instruct test print (step S9). Incidentally, the automatic transmission instruction of the test print instruction may be included in the above-described installation instruction. Subsequently, when the object terminal receives the automatic transmission instruction of the test print instruction, the object terminal automatically transmits the test print instruction to the multifunction peripheral 1. The multifunction peripheral executes the test print in accordance with the test print instruction received from the object terminal (step S10).

In accordance with the first embodiment, as described above, the multifunction peripheral 1 (the image forming apparatus) including the image forming part 11 forming the image includes the user authenticating part 25, the terminal selecting part 26 and the installation instructing part 27. The user authenticating part 25 authenticates the user on the basis of the authentication information peculiar to the user in the installing operation making the external terminal 23 communicably connected to the multifunction peripheral 1 install the driver of the multifunction peripheral 1. The terminal selecting part 26 selects the external terminal 23 registered in association with the user authenticated by the user authenticating part 25 as the object terminal in the installing operation. The installation instructing part 27 establishes remote access to the object terminal on the basis of the log-in information previously registered with regard to the object terminal selected by the terminal selecting part 26 and transmits the installation instruction making the object terminal execute the automatic installation of the driver to the object terminal.

Thereby, if only the user operates the multifunction peripheral 1, the user can install the driver to various external terminals 23 using the multifunction peripheral 1, and the user does not need to come and go between the multifunction peripheral 1 and each external terminal 23, and therefore, it is possible to restrain labor of the user. Incidentally, although the external terminal 23 registered in association with the user is the object terminal in the installation operation, association with the user is not restricted to one external terminal 23, but may have the plural external terminals 23 or may have the external terminals 23 of other users belonging to the group in which the former user is representative.

In addition, since works confirming the host name and the IP address of the multifunction peripheral 1 and setting the host name and the IP address to each external terminal 23 are not required, and it is unnecessary to come and go between the multifunction peripheral 1 and each external terminal 23 in order to confirm such information, it is possible to restrain labor of the user. Thus, it is possible to facilitate installation work of the driver and confirmation work of the host name and the IP address of the image forming apparatus, and to decrease a burden on the user.

Moreover, in a case where the object terminal receiving the installation instruction transmitted by the installation instructing part 27 succeeds the automatic installation of the driver, if the multifunction peripheral 1 receives the success notification of the automatic installation from the object terminal, the installation instructing part 27 transmits the automatic transmission instruction of the test print instruction to the object terminal.

Thereby, in a case where the user executes the test print of the multifunction peripheral 1 with regard to the object terminal to which the driver is installed by operation of the multifunction peripheral 1, the user does not need to come and go between the multifunction peripheral 1 and each external terminal 23, and therefore, it is possible to restrain labor of the user and to decrease a burden on the user.

In the first embodiment, although an example that the multifunction peripheral 1 establishes remote access to the external terminal 23 of the object terminal and transmits the installation instruction making the object terminal execute the automatic installation of the driver to the object terminal in the installing operation was described, the present disclosure is not limited by this example. For example, in a second embodiment, the multifunction peripheral 1 is constructed so as to send an e-mail to the external terminal 23 of the object terminal to send the in installation instruction to the object terminal in the installing operation.

Hereinafter, the multifunction peripheral 1 in the second embodiment will be described, but description of configuration of the second embodiment similar to the first embodiment is omitted. In the second embodiment, the data base 24 registering the users using the multifunction peripheral 1 and the external terminals 23 in association with each other stores respective e-mail addresses of the external terminals 23 instead of the terminal information and the log-in information of the external terminals 23.

Figure 4:
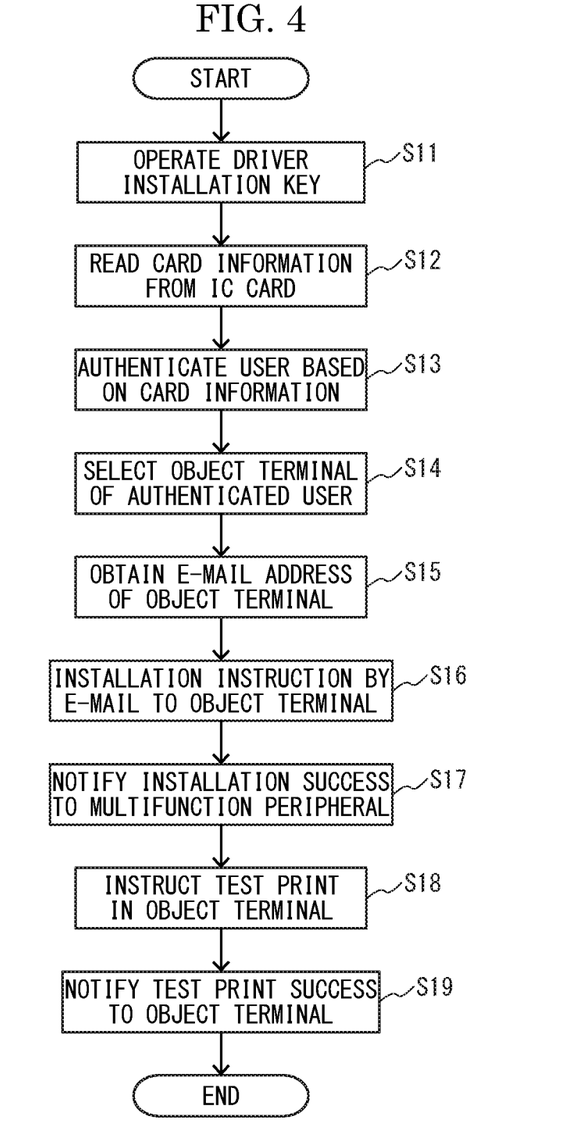
FIG. 4 is a flow chart showing an operation installing a driver of a multifunction peripheral to an external terminal in the multifunction peripheral according a second embodiment of the present disclosure.

The installing operation in which the multifunction peripheral 1 in the second embodiment makes the external terminal 23 install the driver will be described with reference to a flow chart of FIG. 4. In the second embodiment, operation from the installing operation is started (step S11) to the user authentication (steps S12 and S13) and selection of the external terminal 23 as the object terminal (step S14) is similar to the first embodiment.

When the object terminal is selected in the terminal selecting part 26, the controlling part 20 controls the installation instructing part 27 to make the installation instructing part 27 execute installation instruction of the driver to the object terminal. First, the installation instructing part 27 obtains the e-mail address with regard to the object terminal stored in the data base 24 (step S15).

The installation instructing part 27 sends an e-mail instructing installation of the driver in accordance with operation of the object terminal by the user as the installation instruction to the object terminal (step S16). For example, the installation instruction is composed of the e-mail in which the host name and the IP address of the multifunction peripheral 1, the driver name and the storage place of the driver and other information, such as an installing manual, are written. In such a case, the user reads such information from the e-mail and operates the object terminal on the basis of such information, and thereby, installs the driver. Incidentally, the installation instructing part 27 may transmit the e-mail accompanied with the driver itself instead of indication of the storage place of the driver.

Alternatively, the installation instruction is constructed by the e-mail accompanied with an installer file executed in accordance with the user's operation in the object terminal by a batch file, an object code, script data or other program indicating the host name and the IP address of the multifunction peripheral 1 and the driver name and the storage place of the driver. In such a case, the user operates the object terminal to execute the installer file accompanying the e-mail, and thereby, installs the driver.

Otherwise, the installation instruction is constructed by the e-mail including a URL of a download source of the above-described installer file. In such a case, the user operates the object terminal to download the installer file on the basis of the URL of the download source and to execute the installer file, and thereby, installs the driver.

When the object terminal receives the installation instruction, the object terminal installs the driver of the multifunction peripheral 1 in accordance with the user's operation on the basis of the installation instruction. Incidentally, in the second embodiment, similar to the first embodiment, in response to the installation instruction, the success notification (step S17) and the failure notification of installation may be executed.

Moreover, in a case where the object terminal installs the driver on the basis of the installation instruction of the e-mail, the object terminal transmits test print instruction to the multifunction peripheral 1 in accordance with the user's operation (step S18). The multifunction peripheral 1 executes test print in accordance with the test print instruction received from the object terminal. Further, if the installation instructing part 27 transmits the e-mail with the installation instruction to the object terminal, receives the test print instruction from the object terminal and succeeds the test print, the installation instructing part 27 sends success notification of the test print to the object terminal (step S19).

In accordance with the second embodiment, as described above, the multifunction peripheral 1 (the image forming apparatus) including the image forming part 11 forming the image includes the user authenticating part 25, the terminal selecting part 26 and the installation instructing part 27. The user authenticating part 25 authenticates the user on the basis of the authentication information peculiar to the user in the installing operation making the external terminal 23 communicably connected to the multifunction peripheral 1 install the driver of the multifunction peripheral 1. The terminal selecting part 26 selects the external terminal 23 registered in association with the user authenticated by the user authenticating part 25 as the object terminal in the installing operation. The installation instructing part 27 sends the e-mail instructing installation of the driver on the basis of the e-mail address previously registered with regard to the object terminal selected by the terminal selecting part 26 as the installation instruction to the object terminal.

Thereby, the user does not need to confirm the host name and the IP address of the multifunction peripheral 1 and to set the host name and the IP address to each external terminal 23, and the user does not need to come and go between the multifunction peripheral 1 and each external terminal 23, and therefore, it is possible to restrain labor of the user. Thus, it is possible to facilitate installation work of the driver and confirmation work of the host name and the IP address of the image forming apparatus, and to decrease a burden on the user.

Moreover, in a case where the object terminal receiving the installation instruction of the e-mail transmitted by the installation instructing part 27 succeeds installation of the driver, if the multifunction peripheral 1 receives the test print instruction from the object terminal and succeeds the test print, the multifunction peripheral 1 transmits success notification of the test print to the object terminal.

Thereby, in a case where the user installs the driver by operation of the object terminal, the user does not need to come and go between the multifunction peripheral 1 and each external terminal 23 in order to confirm a result of the test print of the multifunction peripheral 1, and therefore, it is possible to restrain labor of the user and to decrease a burden on the user.

Further, in accordance with the first embodiment and the second embodiment, the multifunction peripheral 1 includes the card reader 8 reading the card information from the IC card storing the card information corresponding to the authentication information of the user. The user authenticating part 25 authenticates the user on the basis of the authentication information previously registered in the data base 24 and the card information read by the card reader 8.

Thereby, if only the user holds up the IC card to the multifunction peripheral 1, the user can install the driver to the object terminal being the external terminal 23 registered in association with the user by a simple manner.

For example, the multifunction peripheral 1 is constructed so that the card reader 8 reads one card information from one IC card in one installing operation. In such a case, the user authenticating part 25 authenticates one user on the basis of one card information, and the terminal selecting part 26 selects the external terminal 23 registered in association with one user as the object terminal.

Alternatively, the multifunction peripheral 1 may be constructed so that the card reader 8 reads the plural card informations from the plural IC cards in one installing operation. In such a case, the card reader 8 identifies and reads respective card informations from the plural IC cards held up once in a laminated state, or reads each card information sequentially from the plural IC cards held up one by one for a predetermined time.

Subsequently, the user authenticating part 25 authenticates the plural users on the basis of the plural card informations. The terminal selecting part 26 selects the plural external terminals 23 previously registered in association with the plural users authenticated by the user authenticating part 25 as the plural object terminals in one installing operation, respectively.

Thereby, if only the respective IC cards of the plural users are held up to the multifunction peripheral 1, the user can install the same driver of the same multifunction peripheral 1 to the respective external terminal 23 of the plural users in one installing operation by a simple manner.

Figure 5:
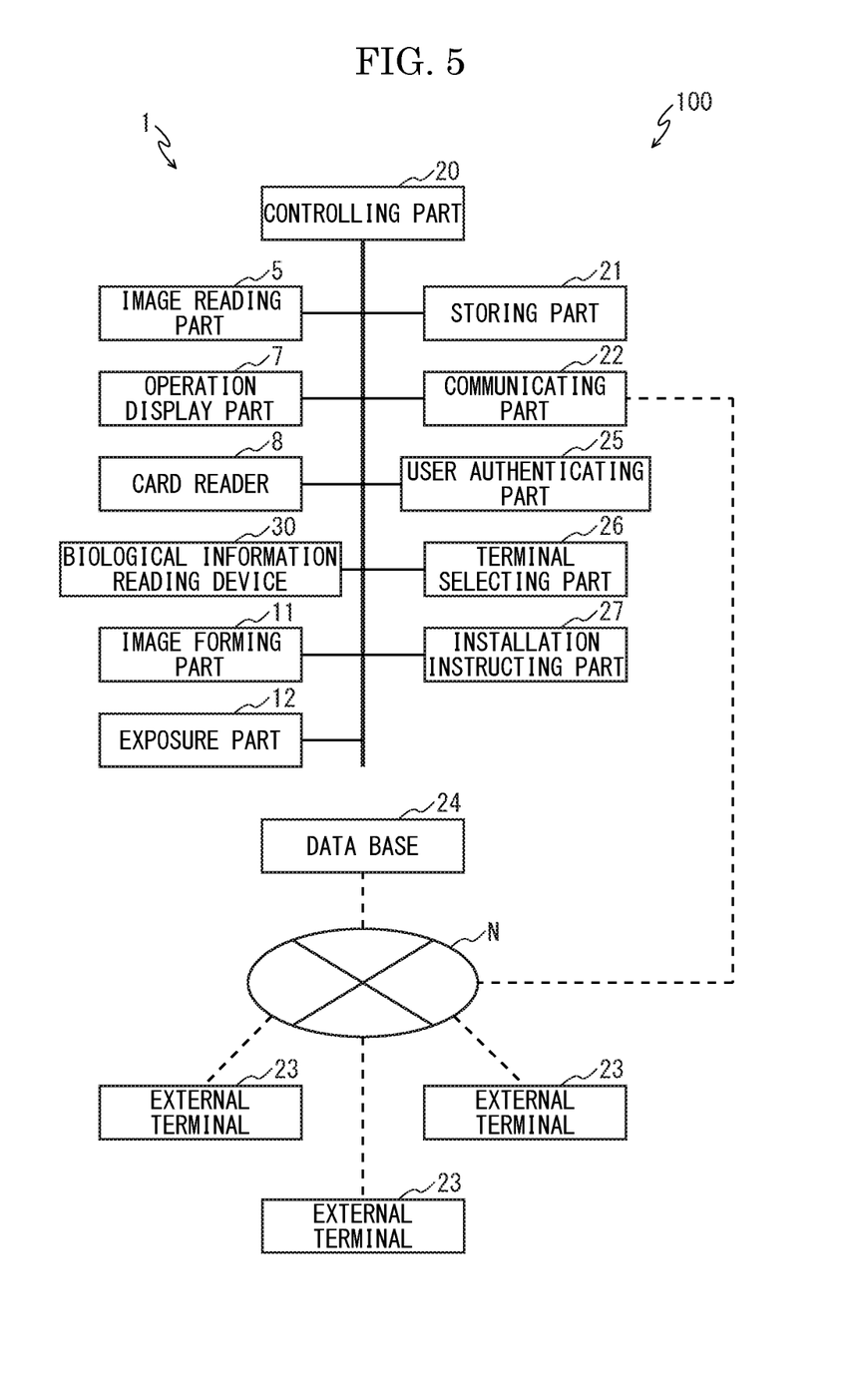
FIG. 5 is a block diagram showing electric structure of an image forming system including a multifunction peripheral according to another embodiment of the present disclosure.

In the first embodiment and the second embodiment, although an example that the card reader 8 is applied in the multifunction peripheral 1 in order to authenticate the user, the present disclosure is not limited by this example. For example, in another embodiment, the multifunction peripheral 1 further may include a biological information reading device 30 in order to authenticate the user as shown in FIG. 5 instead of the card reader 8 or in addition to the card reader 8.

The biological information reading device 30 is constructed so as to read biological information, such as a fingerprint or an iris, of the user. In the data base 24, the authentication information corresponding to the biological information of the user is previously registered in association with the user. The biological information reading device 30 is controlled by the controlling part 20 to send the read biological information to the controlling part 20. The user authenticating part 25 authenticates the user on the basis of the previously registered authentication information and the biological information read by the biological information reading device 30.

Thereby, the multifunction peripheral 1 can authenticate the user by biological authentication without making the user hold up the IC card, and can make the object terminal being the external terminal 23 registered in association with the user install the driver by a further simple manner.

In addition, in another embodiment, the biological information reading device 30 may be constructed so as to identify and read plural biological informations (e.g. fingerprints of respective fingers) of one user, and the data baser 24 registers the plural biological informations with regard to one user. In such a case, if the biological information reading device 30 reads at least any one of the plural biological informations registered with regard to a predetermined user, the user authenticating part 25 authenticates the predetermined user.

Moreover, in a case where the data base 24 registers the plural external terminals 23 in association with the user to which the plural biological informations are registered, the data base 24 may register different external terminals 23 in association with the plural biological informations, respectively. In this case, if the user is authenticated in the user authenticating part, the terminal selecting part 26 selects the external terminal 23 registered in association with the biological information read by the biological information reading device 30 out of the plural biological informations registered in association with the user as the object terminal.

Thereby, in a case where the plural external terminals 23 are registered in association with one user, if only the user changes the biological information used for the biological authentication, it is possible to voluntarily select the external terminal 23 (the voluntary external terminal 23) as the object terminal to install the driver by a simple manner.

Incidentally, in a case where the plural biological informations of one user are registered in the data base 24, the installation instructing part 27 may set different installation instructions (e.g. the installation instruction of the automatic installation in the first embodiment and the installation instruction of the e-mail in the second embodiment) for the respective biological informations.

Figure 6:
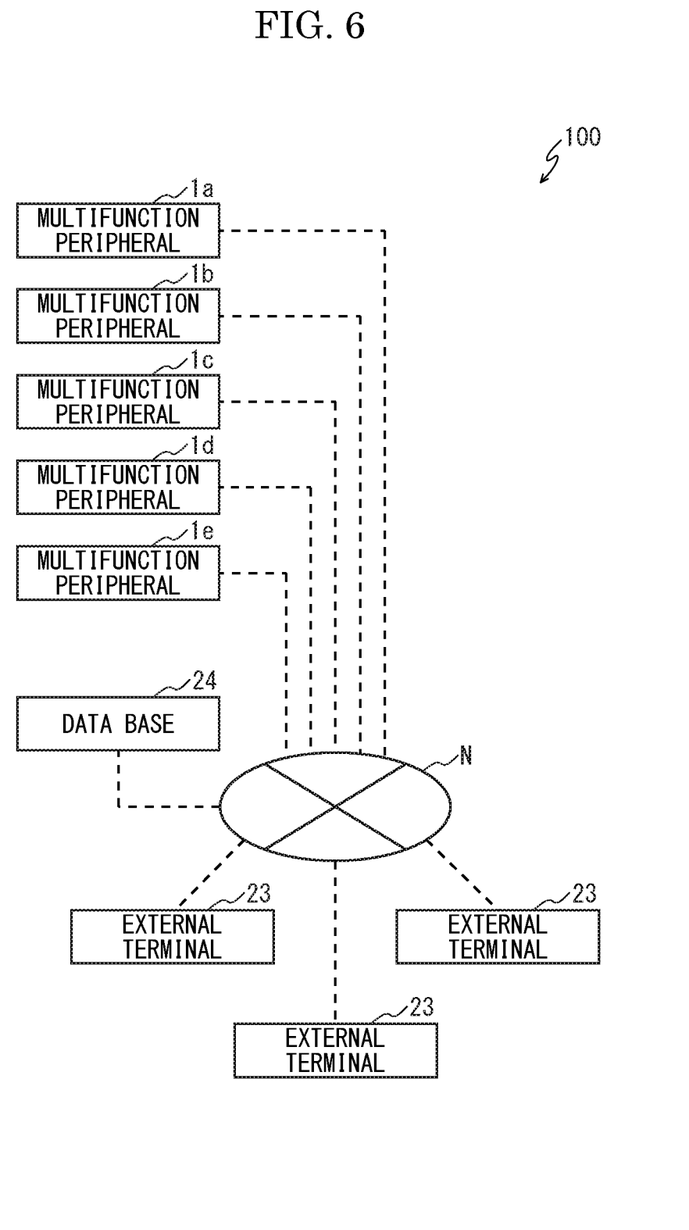
FIG. 6 is a block diagram showing electric structure of an image forming system according to a further embodiment of the present disclosure.

In the above-described embodiments, although an example that the image forming system 100 includes one multifunction peripheral 1 was described, the present disclosure is not limited by this example. For example, in a further embodiment, as shown in FIG. 6, the image forming system 100 may include a plurality of multifunction peripherals 1a-1e. In this image forming system 100, the data base 24 stores "installed" or "not-installed" informations about the respective drivers of the plurality of multifunction peripherals 1a-1e and a kind and a version of the installed driver for each external terminals 23.

Thereupon, in the image forming system 100, in a case where the installing operation is carried out in the predetermined multifunction peripheral 1a out of the plurality of multifunction peripherals 1a-1e to transmit the installation instruction of the driver of the predetermined multifunction peripheral 1a to the object terminal being the external terminal 23 associated with the user, the predetermined multifunction peripheral 1a decides with reference to the data base 24 whether or not the respective drivers of the other multifunction peripherals 1b-1e are installed to the object terminal. Subsequently, the predetermined multifunction peripheral 1a transmits the installation instruction of the not-installed driver out of the drivers of the other multifunction peripherals 1b-1e to the object terminal. Incidentally, the installation instruction of the driver of each of the other multifunction peripherals 1b-1e may be the installation instruction of the automatic installation in the first embodiment or the installation instruction of the e-mail in the second embodiment.

Although the above-described embodiments have described about a case applying the configuration of the present disclosure to the multifunction peripheral 1 or the image forming system 100 including the multifunction peripheral, in a further different embodiment, the configuration of the present disclosure may be applied to another image forming apparatus, such as a printer, a copying machine and a facsimile or another image forming system including such another image forming apparatus.

The above-description of the embodiment of the present disclosure was described about a preferable embodiment of the image forming apparatus and the image forming system according to the disclosure. However, the technical scope of the present disclosure is not limited to the embodiments.

The invention claimed is:

1. An image forming apparatus including an image forming part forming an image comprising:
    a user authenticating part authenticating a user on the basis of authentication information specific to the user in an installing operation making an external terminal communicably connected to the image forming apparatus install a driver of the image forming apparatus;
    a terminal selecting part selecting the external terminal, the selected external terminal is an external terminal that is registered in association with the user authenticated by the user authenticating part as an object terminal in the installing operation;
    an installation instructing part establishing remote access to the object terminal on the basis of log-in information previously registered with regard to the object terminal selected by the terminal selecting part and transmitting an installation instruction making the object terminal execute automatic installation of the driver to the object terminal; and
    a card reader reading card information from an IC card storing the card information corresponding to the authentication information in the installing operation,
    wherein the user authenticating part authenticates the user on the basis of the authentication information previously registered and the card information read by the card reader,
    the card reader respectively reads plural card information from IC cards of plural users in one installing operation,
    the user authenticating part authenticates the plural users on the basis of the plural card information read by the card reader,
    the terminal selecting part selects plural external terminals previously registered in association with the plural users authenticated by the user authenticating part as plural object terminals in the one installing operation, respectively.

2. The image forming apparatus according to claim 1, wherein
    in a case where the object terminal receiving the installation instruction transmitted by the installation instructing part succeeds the automatic installation of the driver, if the image forming apparatus receives a success notification of the automatic installation from the object terminal, the installation instructing part transmits an automatic transmission instruction of test print instruction to the object terminal.

3. The image forming apparatus according to claim 1, wherein the image forming apparatus searches a second image forming apparatus other than the image forming apparatus from among a plurality of image forming apparatuses in an image forming system including the image forming apparatus, the second image forming apparatus being communicably connected to the object terminal selected by the terminal selecting part, if a driver of the second image forming apparatus is not installed to the object terminal, the installation instructing part transmits another installation instruction making the object terminal install the driver of the second image forming apparatus to the object terminal.

4. An image forming apparatus including an image forming part forming an image comprising:
  a user authenticating part authenticating a user on the basis of authentication information specific to the user in an installing operation making an external terminal communicably connected to the image forming apparatus install a driver of the image forming apparatus;
  a terminal selecting part selecting the external terminal, the selected external terminal is an external terminal that is registered in association with the user authenticated by the user authenticating part as an object terminal in the installing operation; and
  an installation instructing part sending an e-mail instructing installation of a driver on the basis of an e-mail address previously registered with regard to the object terminal selected by the terminal selecting part as an installation instruction to the object terminal; and
  a card reader reading card information from an IC card storing the card information corresponding to the authentication information in the installing operation,
  wherein the user authenticating part authenticates the user on the basis of the authentication information previously registered and the card information read by the card reader,
  the card reader respectively reads plural card information from IC cards of plural users in one installing operation,
  the user authenticating part authenticates the plural users on the basis of the plural card information read by the card reader,
  the terminal selecting part selects plural external terminals previously registered in association with the plural users authenticated by the user authenticating part as plural object terminals in one installing operation, respectively.

5. The image forming apparatus according to claim 4, wherein
  in a case where the object terminal receiving the installation instruction of the e-mail transmitted by the installation instructing part succeeds installation of the driver, if the image forming apparatus receives a test print instruction from the object terminal and the test print instruction succeeds, the image forming apparatus transmits a success notification of the test print to the object terminal.

6. An image forming apparatus including an image forming part forming an image comprising:
  a user authenticating part authenticating a user on the basis of authentication information specific to a user in an installing operation making an external terminal communicably connected to the image forming apparatus install a driver of the image forming apparatus;
  a terminal selecting part selecting the external terminal, the selected external terminal is an external terminal that is registered in association with the user authenticated by the user authenticating part as an object terminal in the installing operation;
  an installation instructing part establishing remote access to the object terminal on a basis of log-in information previously registered with regard to the object terminal selected by the terminal selecting part and transmitting an installation instruction making the object terminal execute automatic installation of the driver to the object terminal; and
  a biological information reading device reading biological information of the user corresponding to the authentication information in the installing operation,
  wherein the user authenticating part authenticates the user on the basis of the authentication information previously registered and the biological information read by the biological information reading device,
  the biological information reading device identifies and reads one biological information out of plural biological information of one user in a case in which plural external terminals are associated to the one user and the plural biological information are previously registered in association with the plural external terminals,
  the user authenticating part authenticates the user on the basis of the one biological information read by the biological information reading device,
  the terminal selecting part selects the external terminal that is previously registered in association with the one biological information used for authenticating the user by the user authenticating part as the object terminal.

7. An image forming system comprising:
the image forming apparatus and the external terminal according to claim 1.

8. An image forming system comprising:
the image forming apparatus and the external terminal according to claim 2.

9. An image forming system comprising:
the image forming apparatus and the external terminal according to claim 4.

10. An image forming system comprising:
the image forming apparatus and the external terminal according to claim 5.

11. An image forming system comprising:
the image forming apparatus and the external terminal according to claim 6.

12. An image forming system comprising:
the image forming apparatus, the second image forming apparatus; and the external terminal according to claim 3.

* * * * *